(12) United States Patent
Mohr

(10) Patent No.: US 11,353,076 B2
(45) Date of Patent: Jun. 7, 2022

(54) TORSION SPRING ADJUSTMENT ASSEMBLY FOR A FINGER WHEEL RAKE

(71) Applicant: Ogden Metalworks, Inc., Ogden, IL (US)

(72) Inventor: Calvin Mohr, Ogden, IL (US)

(73) Assignee: Ogden Metalworks, Inc., Ogden, IL (US)

(*) Notice: Subject to any disclaimer, the term of this patent is extended or adjusted under 35 U.S.C. 154(b) by 0 days.

(21) Appl. No.: 16/576,207

(22) Filed: Sep. 19, 2019

(65) Prior Publication Data

US 2020/0096070 A1    Mar. 26, 2020

Related U.S. Application Data

(60) Provisional application No. 62/734,849, filed on Sep. 21, 2018.

(51) Int. Cl.
| | |
|---|---|
| *F16F 1/12* | (2006.01) |
| *A01D 78/14* | (2006.01) |
| *F16F 1/04* | (2006.01) |
| *F16F 15/067* | (2006.01) |

(52) U.S. Cl.
CPC .............. *F16F 1/121* (2013.01); *A01D 78/14* (2013.01); *F16F 1/041* (2013.01); *F16F 15/067* (2013.01); *F16F 2228/08* (2013.01); *F16F 2230/0005* (2013.01)

(58) Field of Classification Search
CPC .......... F16F 1/121; F16F 1/041; F16F 15/067; F16F 2230/0005; F16F 2228/08; F16F 2238/024; F16F 1/06; A01D 78/14

USPC ........ 248/575, 592; 56/11.3, 393, 395, 16.3, 56/192

See application file for complete search history.

(56) References Cited

U.S. PATENT DOCUMENTS

| | | | | |
|---|---|---|---|---|
| 1,087,624 | A * | 2/1914 | Yohn ................ | A01D 87/02 56/360 |
| 1,327,076 | A * | 1/1920 | Zucker .............. | B60G 11/36 267/240 |
| 1,561,562 | A * | 11/1925 | Mowry .............. | A01D 80/00 56/367 |
| 2,044,465 | A * | 6/1936 | Carlson ............. | G05D 23/1931 200/83 C |
| 2,561,548 | A * | 7/1951 | Wharam ............. | B60G 11/181 267/278 |
| 5,956,934 | A * | 9/1999 | Wright .............. | A01D 80/00 56/377 |
| 5,960,620 | A | 10/1999 | Wright et al. | |
| 7,510,168 | B1 * | 3/2009 | Lin .................. | B65B 13/025 24/68 CD |
| 2020/0096070 | A1 * | 3/2020 | Mohr ................ | F16F 1/06 |

* cited by examiner

*Primary Examiner* — Muhammad Ijaz
(74) *Attorney, Agent, or Firm* — McCarter & English, LLP

(57) ABSTRACT

A torsion spring adjustment assembly for supporting a finger wheel rake that includes a lever operably connected to a torsion spring supporting the finger wheel rake for setting the tension of the torsion spring. The lever is pivotable about the axis of a rotational shaft of the finger wheel rake to a plurality of tension-setting positions and is secured to a main frame of the finger wheel rake at a position selected from the plurality of tension-setting positions. The lever is adjusted to a select position and then secured against the adjustment plate by a mechanical fastener.

21 Claims, 8 Drawing Sheets

TORSION SPRING ADJUSTMENT ASSEMBLY FOR A FINGER WHEEL RAKE

CROSS-REFERENCE TO RELATED APPLICATIONS

This application claims priority to U.S. Provisional Application No. 62/734,849, filed Sep. 21, 2018, the contents of which is incorporated herein by reference in its entirety.

BACKGROUND

A finger wheel rake is known in the art. See U.S. Pat. No. 5,960,620. A finger wheel rake, used to form windrows in a field from cut forage, is constructed with one or more rotating finger wheels, each mounted to a support frame through a rake arm, and each supported using a torsion spring mounted to the support frame of the rake to achieve appropriate ground pressure for effective raking. Use of a torsion spring allows support for the rotating finger wheel and/or ground pressure exerted by the finger wheel to be adjusted in response to changes in terrain, ground contours, crop conditions, or during transport.

SUMMARY

The disclosure provides an easily adjustable torsion spring adjustment assembly for supporting a finger wheel rake. The torsion spring adjustment assembly includes a tension-setting lever that is operably connected to a torsion spring supporting a finger wheel rake for setting the tension of the torsion spring. The lever is pivotable about the axis of the rotational shaft of the finger wheel rake to a plurality of tension-setting positions. The lever can be secured to the main frame of the finger wheel rake at a position selected from the plurality of positions using a fastener.

In one aspect, the present disclosure provides a torsion spring adjustment assembly for supporting a finger wheel rake, the assembly comprising a lever operably connected to a torsion spring supporting the finger wheel rake for setting the tension of the torsion spring, wherein the lever is pivotable about the axis of a rotational shaft of the finger wheel rake to a plurality of tension-setting positions and is secured to a main frame of the finger wheel rake at a position selected from the plurality of tension-setting positions.

In some embodiments, the lever is operably connected to the torsion spring through a load-bearing arm to which is secured a first leg of the torsion spring.

In some embodiments, the lever has a pivot portion adjoining the load-bearing arm, the pivot portion comprising an opening though which a cylindrical housing enclosing the rotational shaft passes thereby enabling the lever to be pivotable about the axis of the rotational shaft.

In some embodiments, the lever includes a mounting socket through which the lever is secured to the main frame.

In some embodiments, the lever is secured to the main frame using a mechanical fastener. In some embodiments, the mechanical fastener includes a pin, a pawl, a bolt, a nut, another threaded rotary member, or any combination thereof.

In some embodiments of a torsion spring adjustment assembly provided herein, the main frame comprises a downwardly extending adjustment plate comprising a female connector through which the lever is secured to the main frame, the downwardly extending adjustment plate defining a posterior space occupied by the finger wheel rake and an anterior space occupied by the lever and torsion spring, the female connector extending between the anterior space and posterior space.

In some embodiments, the mounting socket and the female connector are aligned thereby enabling the lever to be secured to the adjustment plate through a male fastener operating through the aligned socket and female connector.

In some embodiments, the female connector includes a plurality of indentations in a curved, rim portion of the adjustment plate that form an arcuate, toothed edge; and the mechanical fastener includes a pawl that engages with the toothed edge of the adjustment plate at a select indentation of the plurality of indentations to secure the lever to the adjustment plate at a select position.

In some embodiments, the female connector includes a plurality of openings uniformly spaced in an arcuate pattern such that each cylindrical opening aligns with the mounting socket when the lever is pivoted to a select position. In some embodiments, the mechanical fastener includes a bolt or a pin that passes through the mounting socket and an aligned opening of the plurality of openings to secure the lever to the adjustment plate at a select position. In some embodiments, the fastener includes a bolt and nut for securing the lever to the adjustment plate.

In some embodiments, the female connector includes an arcuate opening configured to align with the mounting socket as the lever is pivoted. In some embodiments, the fastener includes a bolt or pin that passes through the aligned mounting socket and the arcuate opening to secure the lever to the adjustment plate. In some embodiments, the fastener includes a bolt and a nut.

In some embodiments, the main frame includes a downwardly extending adjustment plate comprising a female connector through which the lever is secured to the main frame, the downwardly extending adjustment plate defining a posterior space occupied by the finger wheel rake and an anterior space occupied by the lever and torsion spring, the female connector extending between the anterior space and posterior space.

In some embodiments, the main frame includes a female connector through which the lever is secured to the main frame, the female connector extending between the anterior space and posterior space.

In some embodiments, the lever is secured to the main frame or the adjustment plate using a mechanical fastener, the lever having: (i) a load-bearing arm to which is secured a first leg of the torsion spring, (ii) a pivot portion adjoining the load-bearing arm, the pivot portion having an opening through which a cylindrical housing enclosing the rotational shaft passes thereby enabling the lever to be pivotable about the axis of the rotational shaft, and (iii) a mounting socket through which the lever is secured to the main frame or adjustment plate; and the mechanical fastener including a male connector that engages with the female connector, the mounting socket, or the female connector and the mounting socket to secure the lever to the adjustment plate. In some embodiments, the female connector can include an arcuate opening; a plurality of openings uniformly spaced in an arcuate pattern; or a plurality of indentations in a curved, rim portion of the adjustment plate that form an arcuate, toothed edge.

In another aspect, the disclosure provides a finger wheel rake with a torsion spring adjustment assembly as described herein.

In another aspect, the disclosure provides a main frame for a finger wheel rake, the main frame being configured with a female connector as described herein for securing a lever as described herein to the mainframe. In another aspect, the disclosure provides a main frame for a finger wheel rake, the main frame having an adjustment plate configured with a female connector as described herein for securing a lever as described herein to the mainframe.

In another aspect, the disclosure provides a lever for setting the tension of a torsion spring of a finger wheel rake as described herein.

As used herein, the singular forms "a", "an", and "the" include plural reference unless the content clearly dictates otherwise.

As used herein, the term "about" in reference to a numeric value means within 10% of the specified value, i.e., within + or −10% of a reference value.

Unless otherwise defined, all technical and scientific terms used herein have the same meaning as commonly understood by one of ordinary skill in the art to which this invention belongs. In case of conflict, the present specification, including definitions, will control. In addition, the materials, methods, and examples are illustrative only and not intended to be limiting. Although methods and materials similar or equivalent to those described herein can be used to practice the invention, suitable methods and materials are described below.

All patents and publications referenced or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

Other features and advantages of the invention will be apparent from the following detailed description and from the claims.

DETAILED DESCRIPTION OF THE INVENTION

Figure 1:
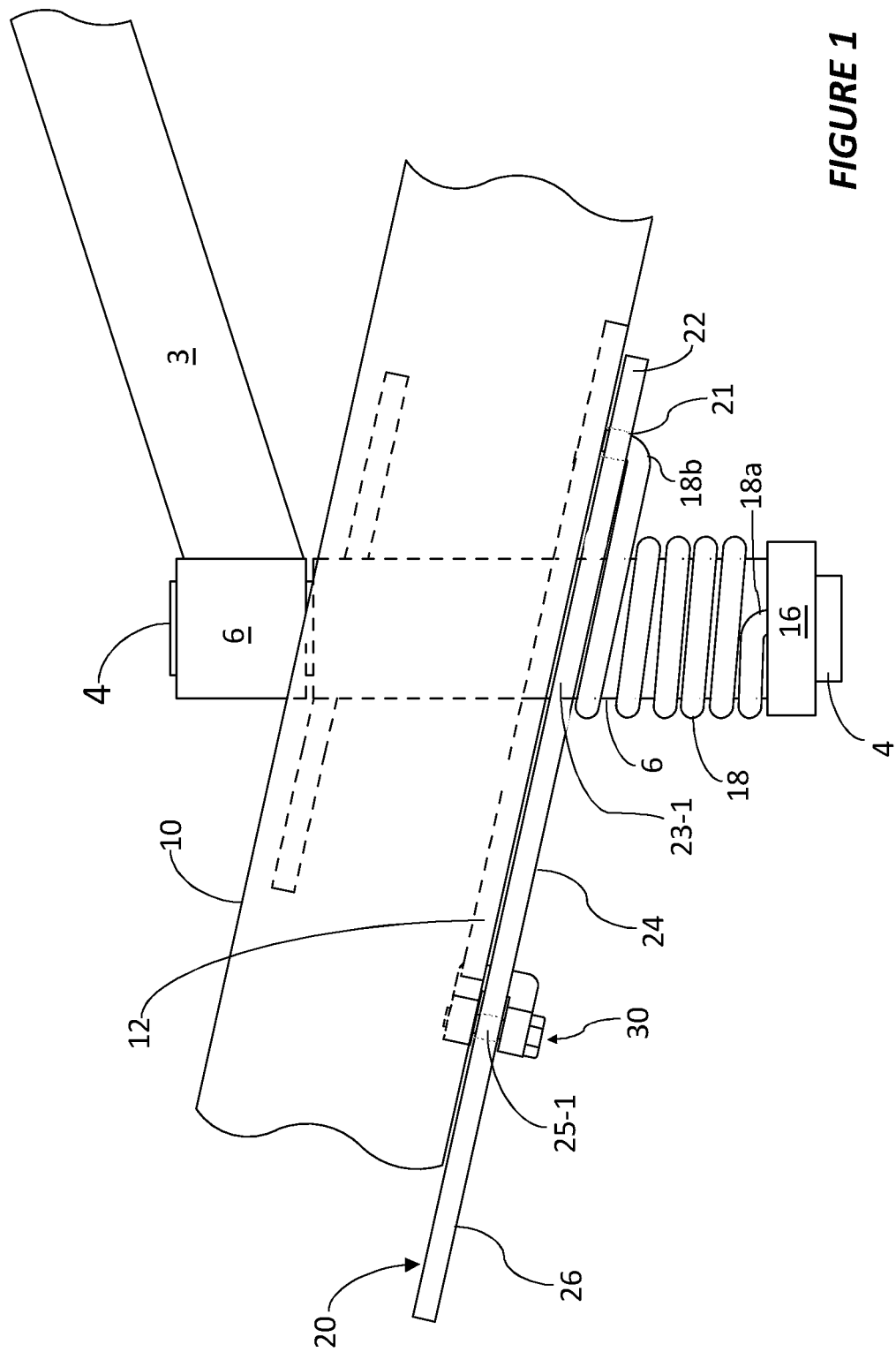
FIG. 1 is a top plan view of the components in an embodiment of a spring adjustment assembly of a finger wheel rake illustrating the relative positions of square main frame 10, tension-setting lever 20 anterior to adjustment plate 12 (beneath main frame 10), and rotational shaft 4 (of finger wheel rake represented by rake arm 3) within cylindrical housing 6 (beneath main frame 10) extending from the posterior to the anterior space defined by adjustment plate 12 (representing adjustment plate 12A, 12B and 12C illustrated in FIGS. 2, 3 and 4, respectively).

The disclosure provides an easily adjustable torsion spring adjustment assembly for supporting a finger wheel rake. The torsion spring adjustment assembly includes a tension-setting lever that is operably connected to a torsion spring supporting a finger wheel rake for setting the tension of the torsion spring. The lever is pivotable about the axis of the rotational shaft of the finger wheel rake to a plurality of tension-setting positions. The lever can be secured to the main frame of the finger wheel rake at a position selected from the plurality of positions using a fastener.

In an assembly of the present disclosure, the lever can be secured to the main frame through a downwardly extending adjustment plate welded to the main frame. The adjustment plate is part of the main frame weldment of a finger wheel rake and can be welded to the underside of a square tube that forms the main frame and extends downwardly to define a posterior space occupied by a finger wheel rake and an anterior space occupied by a torsion spring operably connected to a tension-setting lever.

As described herein, two components or members of an assembly provided herein are "operably connected" where the operation or function of one component affects or is affected by the operation or function of the other component. The torsion spring being operably connected to a tension-setting lever enables the lever to set the tension of the spring or torque support provided by the torsion spring to the rake arm rotational shaft.

The adjustment plate includes an opening through which the rotational shaft of a finger wheel rake (situated within its cylindrical housing) passes from the posterior to the anterior space to operably connect with a supporting torsion spring in the anterior space through a cam block connector. The rotational shaft being operably connected to a torsion spring enables the spring to provide torque support to the rotational shaft thereby determining the downward pressure applied by the rake wheel that is connected to the rotational shaft.

The adjustment plate is configured with a female connector through which a fastener operates to secure the tension-setting lever to the adjustment plate. The female connector can be a single arcuate connector or a plurality of connectors uniformly spaced in an arcuate pattern on the adjustment plate. The single arcuate connector can be a slot in the shape of an arc. The plurality of connectors can be a plurality of openings uniformly spaced in an arcuate formation or pattern. The plurality of connectors can be a plurality of notches uniformly spaced on a curved portion of the edge of the adjustment plate. The arcuate connector or plurality of connectors can occupy a space having the shape of a circular arc with end points defining a minor arc of about 180 degrees or less such as, for example, about 135 degrees or less, about 90 degrees or less, about 85 degrees or less, about 80 degrees or less, about 75 degrees or less, about 70 degrees or less, about 65 degrees or less, or any angle measure in therebetween. As used herein, the term "about" in reference to a numeric value means within 10% of the referenced value. Thus, wherein the adjustment plate includes a single arcuate connector, the connector can have an arcuate shape with an angle measure of about 180 degrees or less such as, for example, about 135 degrees or less, about 90 degrees or less, about 85 degrees or less, about 80 degrees or less, about 75 degrees or less, about 70 degrees or less, about 65 degrees or less, or any angle measure in therebetween. Where the adjustment plate has a plurality of female connectors uniformly spaced in an arcuate pattern on the adjustment plate, the first and last connector can be about 180 degrees or less apart such as, for example, about 135 degrees apart or less, about 90 degrees apart or less, about 85 degrees apart or less, about 80 degrees apart or less, about 75 degrees apart or less, about 70 degrees apart or less, about 65 degrees apart or less, or any angle measure in therebetween. In these embodiments, adjacent female connectors can be about 3 to about 15 degrees apart, for example, about 3, 4, 5, 6, 7, 8, 9, 10, 11, 12, 13, 14, or 15 degrees apart. Where the adjustment plate has a plurality of connectors uniformly spaced, the adjustment plate can have any convenient number of connectors including for example, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 connectors uniformly spaced in an arcuate pattern.

The tension-setting lever allows the user to set the tension of the torsion spring to select the desired down pressure of the rake. The tension-setting lever includes a pivot portion, a load-bearing portion, and a mounting portion.

The pivot portion of the tension-setting lever includes a central circular opening through which the rotational shaft within its cylindrical housing passes to allow the lever to pivot about the rotational shaft within its housing. The circular pivot opening is sized to accommodate the cylindrical housing containing the rotational shaft such that the three components, i.e. circular pivot opening, cylindrical housing and rotational shaft, are co-axial. As such, the center of the circular pivot opening aligns with or is on the longitudinal axis of the cylindrical housing and rotational shaft thereby enabling the lever to pivot about the cylindrical housing and rotational shaft. The position of the lever is adjusted or pivoted about its pivot portion to determine a tension setting.

The mounting portion of the tension-setting lever enables the lever to be secured against the adjustment plate at a select tension-setting position. The mounting portion includes a mounting socket through which a fastener operates to secure the lever to the adjustment plate. Any connector, fastener, or connector/fastener system known in the art for forming a non-permanent or temporary joint between two members can be used to secure the lever to the adjustment plate. The fastener can be a nonpermanent fastener such as a mechanical fastener and can be a single component such as a bolt or a pin that operates to secure the lever to the adjustment plate. The fastener can include any combination of male and female components including a blot, threaded screw, cap-screw, setscrews, power screws, stud, nut, pin, clip as known in the art.

The load-bearing portion of the lever includes a connector that allows a leg of a tension spring to be secured to the lever. The connector can be a socket within which the spring leg is secured. The loading connector can be any connector known in the art that can be used to secure a spring leg. As such, the load-bearing portion is a portion of the lever to which a toque-adjustment leg of a tension spring is attached. The load-bearing portion of a lever can extend from the pivot portion at one end of the lever to the mounting portion at the other end of the lever. The lever can also include a separate handle portion extending from the mounting portion. In these embodiments, the lever can include a load-bearing portion and a handle portion as exemplified by lever 40 in FIGS. 5-8 in which the load-bearing portion is situated between the pivot portion and the mounting portion, while the handle portion extends from the mounting portion to a lever end. In these embodiments, the load-bearing and handle portions can form an angle about the mounting portion designed as angle b. Angle b can be of any convenient size, for example, less than about 180 degrees, such as about 170 degrees, about 160 degrees, about 150 degrees, about 140 degrees, about 130 degrees or any that is convenient. Alternatively, the lever can include two handle portions and a loading portion as exemplified by lever 20 illustrated in FIGS. 1-4, in which case, the lever can have two bends with a pivot angle p and an bend in the handle of angle b. In these embodiments, angle p can be less than about 180 degrees, such as about 170 degrees, about 160 degrees, about 150 degrees, about 145 degrees, about 140 degrees, about 135 degrees, about 130 degrees, about 125 degrees, about 120 degrees, about 115 degrees, about 110 degrees, about 105, or about 100 degrees. And angle b can be as described above.

In general, a lever provided by the instant disclosure can be straight (without a bend) or it can be configured with one or two bends to form two or three segments, respectively. As discussed above, FIGS. 2, 3 and 4 illustrate a lever with two bends forming three distinct segments: a first load-bearing segment defined by a first end to which torsion spring leg attaches extending to a pivot bend (for example, pivot portion 23 with angle p); a second segment (handle portion 24) extending from the pivot bend to the adjustment plate contact region (i.e. mounting portion 25 with mounting socket 25-1); and a third segment or handle end portion extending from the adjustment plate contact region to a second end of the tension-setting lever (handle 26). In other embodiments, the tension-setting lever can have no bend in its structure.

In an spring adjustment assembly of the present disclosure, the position of the tension-setting lever is adjusted thereby adjusting the down pressure or torque provided by a torsion spring. Once adjusted to a select position or desired down pressure/tension setting, the tension-setting lever is secured against adjustment plate using fastener. Any fastener known to those in the art can be used.

Specific embodiments of the invention are described in the following examples, which do not limit the scope of the invention described in the claims.

EXAMPLE

Example 1—Torsion Spring and Spring Adjustment Assembly

FIG. 1 provides a top down view of an embodiment of an assembly provided by the present disclosure and illustrates the positions of (a) main frame 10 of a finger wheel rake represented by rake arm 3, (b) torsion spring 18, which provides torque support to a finger wheel rake, and (c) a spring adjustment assembly that includes adjustment plate 12 (beneath main frame 10), tension-setting lever 20 (anterior to adjustment plate 12), and fastener 30 for setting the tension of the spring supporting the finger wheel rake.

Main frame 10 is a square tube to which is welded a series of cylindrical housing 6, each of which houses the rotational shaft 4 of a rake arm. Adjustment plate 12 is also welded to the underside of main frame 10. As such, the main frame weldment, which includes cylindrical housing 6 and adjustment plate 12, ties a series of rake arm weldments together to merge hay into a windrow for baling.

Torsion spring 18, which supports a finger wheel rake represented by rake arm 3, coils around the exterior portion of cylindrical housing 6 that is anterior to the tension-setting lever 20/adjustment plate 12 and thus is supported by cylindrical housing 6. Spring 18 has fixed leg 18*a* and torque adjustment leg 18*b*. Fixed leg 18*a* is operably connected to rotational shaft 4 of rake arm 3 though cam block connector 16 to allow spring 18 to provide torque support to rotational shaft 4. Cam block connector 16 is attached to rake arm rotational shaft 4, as well as torsion spring leg 18*a* so as to provide the negative (opposing) force from the torsion spring 18 to the rake arm 3 through rotational shaft 4. Rotational shaft 4 passes through cylindrical housing 6, which is beneath and part of a mainframe weldment that includes square tube forming main frame 10. Rotational shaft 4 pivots about its longitudinal axis as the rake wheel moves up and down with ground contour. Torque adjustment leg 18*b* is secured to lever 20 at loading socket 21 to enable lever 20 to adjust the torque of spring 18 thereby setting the opposing force provided by spring 18.

The spring adjustment assembly includes stationary adjustment plate 12 against which lever 20 is held in a select position. Adjustment plate 12, which is welded to the underside of main frame 10, extends downwardly from the underside of main frame 10 to define a posterior space occupied by a finger wheel rake represented by rake arm 3 and an anterior space occupied by lever 20 and torsion spring 18. Adjustment plate 12 is configured with opening 11 through which cylindrical housing 6 and rotational shaft 4 of a finger wheel rake pass from the anterior space to the posterior space thereby allowing rotational shaft 4 to operably connect with supporting torsion spring 18 through cam block connector 16. Adjustment plate 12 is also configured with one or more female connectors spaced in an arcuate configuration through which fastener 30 operates to anchor tension-setting lever 20 to a select position against adjustment plate 12 (see FIGS. 2-4).

Tension-setting lever 20 is secured to the anterior side of adjustment plate 12. Lever 20 includes load-bearing arm 22, pivot portion 23, first handle portion 24, mounting portion 25, and handle end portion 26. Load-bearing arm 22 includes loading socket 21 to which torque adjustment leg 18*b* of spring 18 is mounted. Lever 20 includes pivot portion 23 (FIGS. 2-4), which is disposed between load-bearing arm 22 and first handle portion 24. Pivot portion 23 includes circular opening 23-1 (FIG. 1) that accommodates cylindrical housing 6 within which rake arm rotational shaft 4 is housed and about which lever 20 pivots. Circular opening 23-1, cylindrical housing 6, and rotational shaft 4 are generally aligned in a co-axial position.

Figure 2:
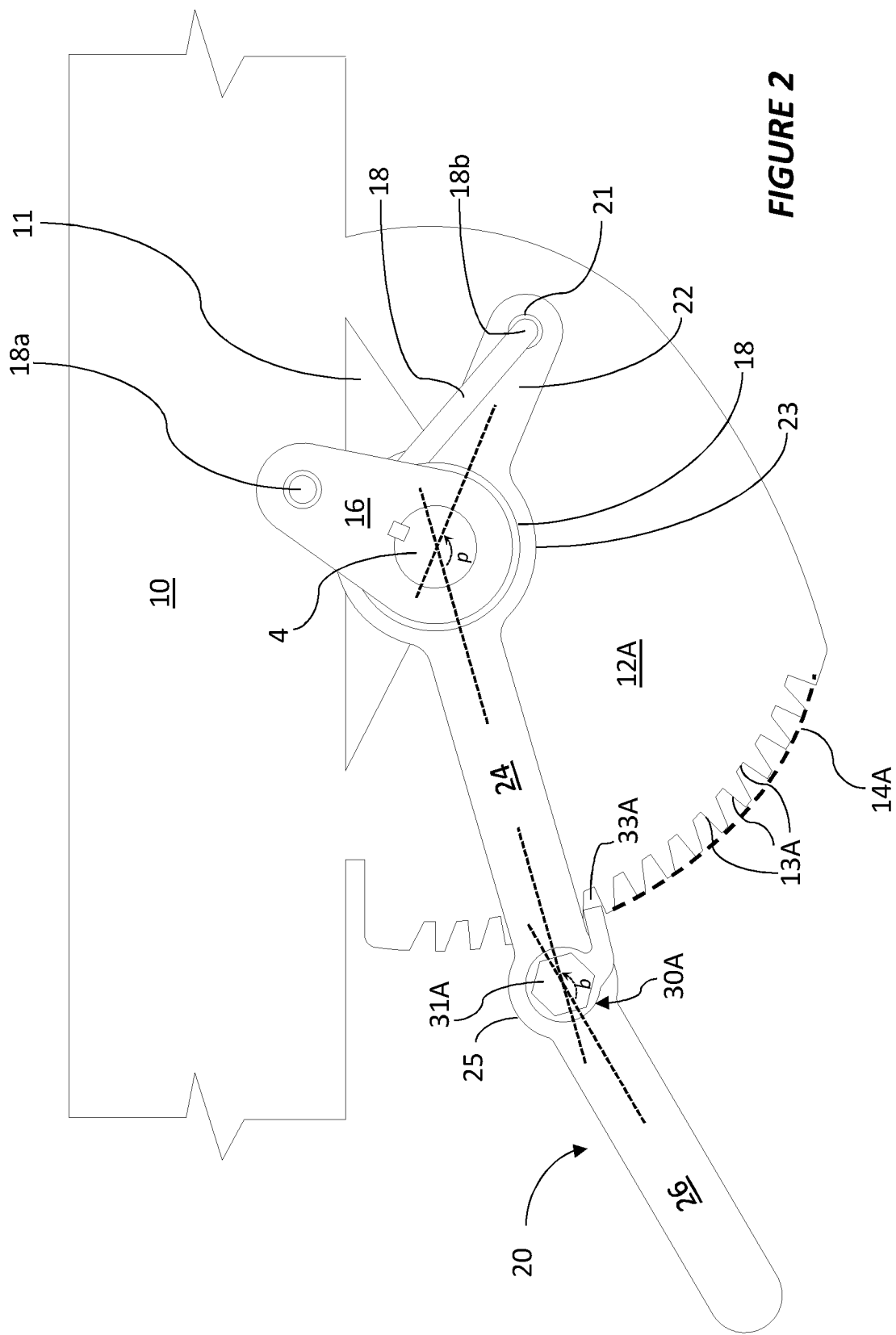
FIG. 2 is an elevational view of a ratchet-style spring adjustment assembly that includes lever 20, which is secured to adjustment plate 12A at a select position by fastener 30A, which engages with notch 13A on the edge of adjustment plate 12A, adjustment plate 12A being configured with a plurality of uniformly spaced notch 13A for engaging with clip 33A to hold lever 20 in a select position against adjustment plate 12A.
Figure 3:
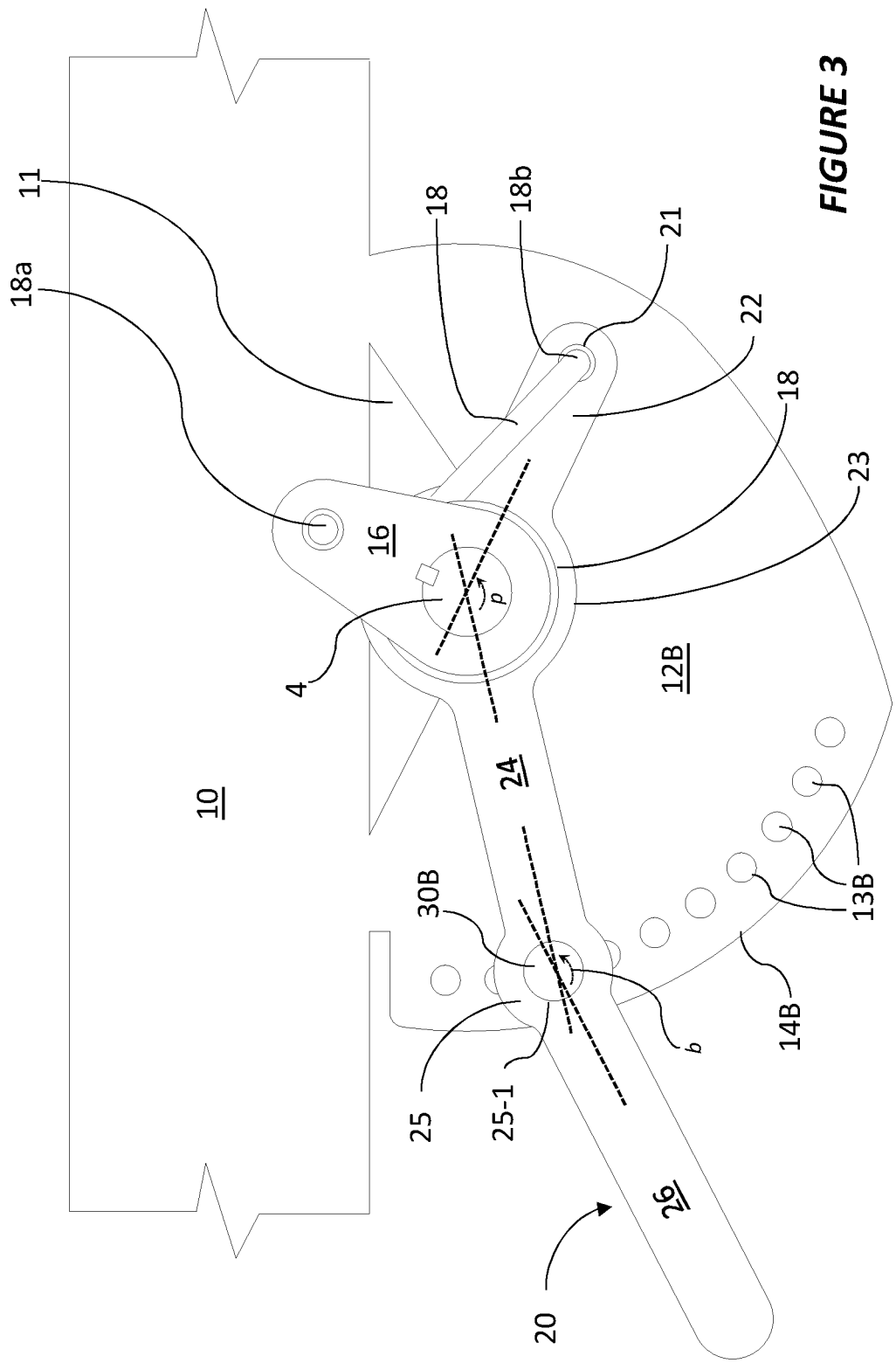
FIG. 3 is an elevational view of a spring adjustment assembly utilizing a simple pin lock mechanism that includes lever 20, which is secured to adjustment plate 12B at a select position by pin fastener 30B, which passes through mounting socket 25-1 of lever 20 and opening 13B on adjustment plate 12B to secure lever 20 to adjustment plate 12B, adjustment plate 12B having a plurality of openings 13B uniformly spaced in an arcuate pattern for receiving pin fastener 30B.
Figure 4:
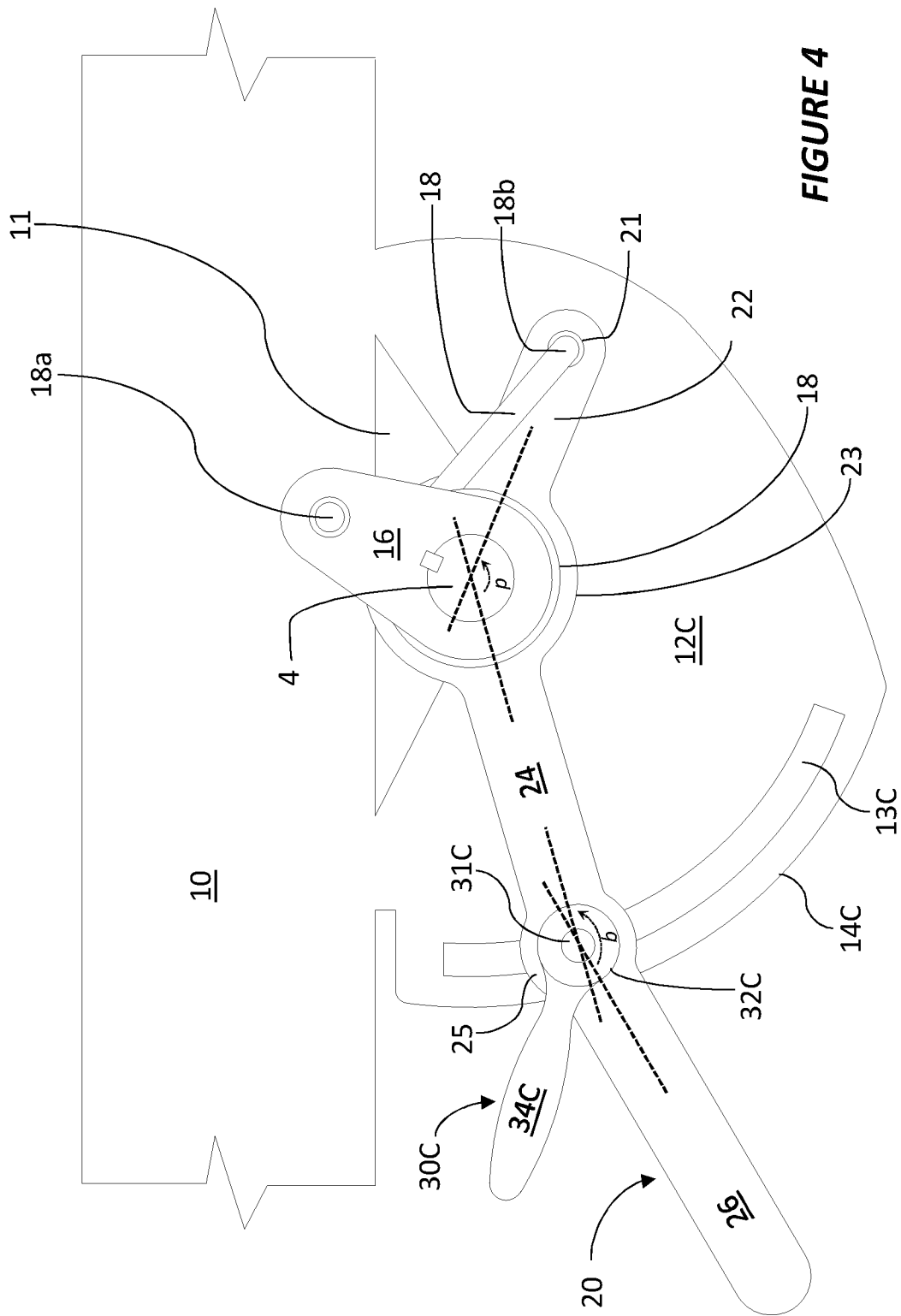
FIG. 4 is an elevational view of a bolt-and-slot spring adjustment assembly that includes lever 20, which is secured to adjustment plate 12C at a select position through operation of rotary fastener pair 30C, which includes anchor bolt 31C and nut 32C (with handle 34C), anchor bolt 31C passing through mounting socket 25-1 (see FIG. 1) of lever 20 and arcuate slot 13C on adjustment plate 12C and held in place by nut 32C, thereby securing lever 20 against adjustment plate 12C at the select position.

Lever 20 also includes mounting portion 25 (FIGS. 2-4) with socket 25-1 (FIG. 1) through which lever 20 is held to adjustment plate 12 through operation of male fastener 30. Mounting portion 25 can be situated at a convenient location, for example, at an internal location on lever 20 to form first handle portion 24 with a free handle end portion 26 as shown in FIGS. 1, 2, 3 and 4. The handle can be straight or includes one or more bends between handle sections as discussed above. FIGS. 2, 3 and 4 illustrates lever 20, which includes a lever with a bend between a first handle portion (24) and a handle free end portion (26) and a pivot bend between loading portion 22 and first handle portion 24.

Thus, lever 20 pivots at pivot portion 23 around cylindrical housing 6 on the main weldment frame that houses the rake arm rotational shaft, which occupies opening 23-1, to control the opposing leg on the torsion spring thereby adjusting the amount of down pressure on the rake wheel through cam block connector 16.

Lever 20 is anchored to adjustment plate 12 using fastener 30. Fastener 30 includes a male connector that operates through mounting socket 25-1 (FIG. 1), a female connector on adjustment plate 12, or mounting socket 25 and a female connector on adjustment plate 12, to secure lever 20 to plate 12. The male connector can be, for example, a rotary, threaded or non-threaded connector including, without limitation, a bolt, simple pin, clip, pawl, cog or any combination thereof, as exemplified in the following embodiments. Fastener 30 can include a rotary, threaded or un-threaded fastener including any combination of male- and/or female-type rotary, threaded or un-threaded fasteners known in the art. Examples include, without limitation, a bolt and a nut combination as known in the art and illustrated herein, a pawl and ratchet device, a simple pin operating through a hole or socket.

Example 2—Spring Adjustment Assembly with Pawl-and-Ratchet Fastener

FIG. 2 illustrates a spring adjustment assembly that utilizes a pawl-and-ratchet system for adjusting the torque of a torsion spring supporting a finger wheel rake. The pawl-and-ratchet system includes: (1) adjustment plate 12A, which is beneath main frame weldment 10 of a finger wheel rake and against which lever 20 operates to set the torque of spring 18; (2) tension-setting lever 20, which is secured to adjustment plate 12A in a select position by fastener 30A and to which spring 18 is operably attached through torque adjustment leg 18*b*; and (3) fastener 30A, which secures lever 20 to adjustment plate 12A at a select torque-determining position.

Adjustment Plate 12A

Adjustment plate 12A is situated underneath main frame 10 and defines a posterior space occupied by a finger wheel rake represented by rake arm 3 and an anterior space occupied by supporting torsion spring 18 and lever 20. Adjustment plate 12A is configured with opening 11 through which cylindrical housing 6 (not shown) enclosing rotational shaft 4 passes from the posterior space to the anterior space. Adjustment plate 12A has arcuate rim portion 14A (broken line) configured with a plurality of openings in the form of notches 13A that form a toothed edge with which pawl fastener 30A engages to anchor lever 20 and set the torque of torsion spring 18. Rim portion 14A and plurality of notches 13A form an arc at a constant distance from rotational shaft 4 about which lever 20 pivots, the arc having a radius that reflects the distance from rim 14A or notches 13A to the nearest point on the longitudinal axis of the shaft 4. Rim portion 14A and its plurality of notches 13A are configured to align with pawl fastener 30A at any position to which lever 20 can be adjusted. Rim portion 14A and its plurality of notches 13A are aligned with pawl fastener 30A where free pawl end 33A can be positioned to fit within any notch of the plurality of notches 13A so as to allow pawl 30A to anchor lever 20 to adjustment plate 12A. Thus, rim portion 14A and plurality of notches 13A are each sized, shaped, and positioned to allow pawl free end 33A to occupy or engage with any select notch of the plurality of notches 13A to anchor lever 20 to adjustment plate 12A.

Tension-Setting Lever 20

Tension-setting lever 20 operates on the anterior side of adjustment plate 12A. Lever 20 is a three-section lever that includes a load-bearing section on one side of a pivot portion and two handle sections on the other side of the pivot portion as illustrated in FIGS. 2-4. The three-section lever includes: (1) load-bearing arm 22 to which torque adjustment leg 18*b* of spring 18 attaches at opening 21; (2) handle portion 24 and handle end portion 26 for adjusting the position lever 20; (3) pivot portion 23 disposed between load-bearing arm 22 and handle portion 24 about which lever 20 pivots; and (4) mounting portion 25 with socket 25-1 (FIG. 1) through which fastener 30A operates to anchor lever 20 to adjustment plate 12A.

Load-bearing arm 22 and handle portion 24 each adjoins pivot portion 23 and extends outwardly from pivot portion 23 to form pivot angle p of about 162 degrees (FIGS. 2, 3, and 4). Pivot portion 23 includes circular opening 23-1 (FIG. 1) through which cylindrical housing 6 supporting rotational shaft 4 of finger wheel rake extends from the posterior side of adjustment plate 12A to the anterior side of adjustment plate 12A to allow lever 20 to pivot about cylindrical housing 6/rotational shaft 4 (the pivot point of lever 20 aligning on the longitudinal axis of rotational shaft 4) and to allow rotational shaft 4 to operably connect with supporting torsion spring 18 through cam connector 16 on the anterior side of adjustment plate 12A. As such, circular opening 23-1 also aligns with opening 11 on adjustment plate 12A, without necessarily being co-extensive.

Mounting portion 25 is situated at an internal position thereby defining handle portion 24 and free end portion 26. Handle portion 24 and handle free end 26 each adjoins mounting portion 25 and extends outwardly from mounting portion 25 to form a bend with angle b of about 170 degrees. Mounting portion 25 includes mounting socket 25-1 (FIG. 1) through which pawl fastener 30A operates to anchor lever 20 to adjustment plate 12A at a select position. The distance from center of mounting socket 25-1 to center of opening 23-1 is configured to account for the arc radius of adjustment plate 12A, i.e., the distance from rim portion 14A or notches 13A to nearest point on longitudinal axis of rotational shaft 4, in order to allow pawl fastener 30A to securely occupy any select notch of the plurality of notches 14A.

Pawl Fastener 30A

Pawl fastener 30A is secured to lever 20 at mounting portion 25 by bolt or pin 31A. The pawl free end 33A engages with a select notch of the plurality of notches 13A to anchor lever 20 to adjustment plate 12A at a select position. Pawl fastener 30A and pawl free end 33A are configured to align with rim portion 14 and its plurality of notches 13A at any position to which lever 20 can be adjusted to provide torque support to torsion spring 18. Pawl fastener 30A and pawl free end 33A are aligned with rim portion 14A and its plurality of notches 13A where pawl fastener 30A and pawl free end 33A can be positioned to fit within any notch of the plurality of notches 13A so as to allow pawl 30A to anchor lever 20 to adjustment plate 12A. Thus, pawl fastener 30A and pawl free end 33A are each positioned, sized and/or shaped to occupy and/or engage with any select notch of the plurality of notches 13A to anchor lever 20 to adjustment plate 12A as shown in FIG. 2.

Example 3—Spring Adjustment Assembly Utilizing Simple Pin

FIG. 3 illustrates a spring adjustment assembly that utilizes a simple pin fastener for maintaining the torque of a torsion spring supporting a finger wheel rake. The spring adjustment assembly that utilizes a simple pin fastener includes: (1) adjustment plate 12B, which is beneath main frame weldment 10 of a finger wheel rake and against which tension-setting lever 20 operates to set the torque of spring 18; (2) lever 20, which is secured to adjustment plate 12B in a select position by pin fastener 30B and to which spring 18 is operably attached through torque adjustment leg 18*b*; and (3) pin fastener 30B, which anchors lever 20 to adjustment plate 12B at a select torque-determining position.

Adjustment Plate 12B

Adjustment plate 12B is situated underneath main frame 10 and defines a posterior space occupied by a finger wheel rake represented by rake arm 3 and an anterior space occupied by supporting torsion spring 18 and lever 20. Adjustment plate 12B is configured with opening 11 through which cylindrical housing 6 (not visible) enclosing rotational shaft 4 passes from the anterior space to the posterior space to operably connect, through cam block connector 16, with supporting torsion spring 18. Adjustment plate 12B has a curved rim portion 14B and a plurality of openings 13B uniformly spaced in an arcuate pattern such that each opening of the plurality of openings 13B is positioned to enable alignment with mounting socket 25-1 when lever 20B is pivoted to a select position. Alignment between each opening of the plurality of openings 13B and mounting socket 25-1 of lever 20 is enabled where the plurality of openings 13B forms an arc at a constant distance from rotational shaft 4 about which lever 20 pivots, the arc having a radius that corresponds to the distance from the center of each opening of the plurality of openings 13B to the nearest point on the longitudinal axis of the shaft 4, which also corresponds to the distance from the center of mounting socket 25-1 to the nearest point on the longitudinal axis of shaft 4. That is, mounting socket 25-1 and each opening of the plurality of openings 13B are equidistance to rotational shaft 4. When mounting socket 25-1 and an opening of the plurality of openings 13B are aligned, pin fastener 30B operates through the aligned openings to anchor lever 20 to adjustment plate 12B. Thus, each opening of the plurality of openings 13B is sized to receive pin fastener 30B and to retain pin fastener 30B snuggly within. Each opening of the plurality of openings 13B is positioned to track the positions to which lever 20/mounting portion 25 can be pivoted so as to allow for alignment of each opening of the plurality of openings 13B with mounting socket 25-1 and insertion of pin fastener 30B through the aligned openings to anchor lever 20 to adjustment plate 12B.

Lever 20

Lever 20 operates on the anterior side of adjustment plate 12B as discussed above for adjustment plate 12A. Lever 20 is mounted to adjustment plate 12B through mounting portion 25. Mounting portion 25 includes mounting socket 25-1, which is sized to receive pin fastener 30B and to retain pin fastener 30B snuggly. Mounting socket 25-1 is also positioned so that the distance from its center to the center of opening 23-1 corresponds to the arc radius of adjustment plate 12B as discussed above to allow for alignment of mounting socket 25-1 with each opening of the plurality of openings 13B on adjustment plate 12B and operation of pin 30B to anchor lever 20 to adjustment plate 12B at a selection position. That is, mounting socket 25-1 and each of openings 13B positioned to be equidistance to rotational shaft 4.

Pin Fastener 30B

Pin fastener 30B is a simple pin that is inserted into and snuggly held within mounting socket 25-1 and an aligned opening of the plurality of openings 13B to lock lever 20 in position so as to anchor lever 20 to adjustment plate 12B at a select position. Thus, pin fastener 30B is sized and/or configured to snuggly occupy mounting socket 25-1 and each opening of the plurality of openings 13B to allow it to operate to anchor lever 20 to adjustment plate 12B.

Example 4—Spring Adjustment Assembly Utilizing Arcuate Slot

FIG. 4 illustrates a spring adjustment assembly that utilizes a rotary fastener pair in combination with an arcuate slot to adjust the torque of a torsion spring supporting a finger wheel rake. The spring adjustment assembly illustrated in FIG. 4 includes: (1) adjustment plate 12C, which is beneath main frame weldment 10 of a finger wheel rake and against which lever 20 operates to set the torque of spring 18; (2) lever 20, which is secured to adjustment plate 12C in a select position by rotary fastener pair 30C and to which spring 18 is operably attached through torque adjustment leg 18b; and (3) rotary fastener pair 30C, which anchors lever 20 to adjustment plate 12C at a select torque-determining position.

Adjustment Plate 12C

Adjustment plate 12C is situated underneath main frame 10 and defines a posterior space occupied by a finger wheel rake represented by rake arm 3 and an anterior space occupied by supporting torsion spring 18 and adjustment lever 20. Adjustment plate 12C is configured with opening 11 through which cylindrical housing 6 enclosing rotational shaft 4 passes from the anterior space to the posterior space. Adjustment plate 12C has a curved rim portion 14C and arcuate slot 13C that tracks the path of sweep of mounting socket 25-1 as lever 20 is pivoted about pivot portion 23. Arcuate slot 13C and mounting socket 25-1 are equidistance to rotational shaft 4, arcuate slot 13C having an arc radius (measured from its longitudinal center) that corresponds to the distance from the center of mounting socket 25-1 to the nearest point on the longitudinal axis of shaft 4. The alignment of mounting socket 25-1 and arcuate slot 13C allows rotary fastener pair 30C to operate through the aligned openings to anchor lever 20 to adjustment plate 12C thereby providing torque support to torsion spring 18.

Lever 20

Lever 20 operates on the anterior side of adjustment plate 12C as discussed above for adjustment plate 12A and 12B. Lever 20 is secured to adjustment plate 12C at mounting portion 25. Mounting portion 25 includes mounting socket 25-1 (FIG. 1) through which rotary fastener pair 30C operates to anchor lever 20 to adjustment plate 12C. Thus, mounting socket 25-1 is configured to operate with rotary fastener 30C. It is positioned so that the distance from its center to the center of opening 23-1 corresponds to the arc radius of arcuate slot 13C as discussed above to allow for alignment of mounting socket 25-1 with arcuate slot 13C and operation of rotary fastener pair 30C to anchor lever 20 to adjustment plate 12C at a selected position. That is, mounting socket 25-1 is positioned so that it and arcuate slot 13C are equidistance to rotational shaft 4.

Rotary Fastener Pair 30C

Rotary fastener 30C includes bolt 31C and nut 32C with handle 34C. Bolt 31C is inserted though aligned arcuate slot 13C and mounting socket 25-1 and held in place using nut 32C to anchor lever 20 to adjustment plate 12C at a select position. Thus, bolt 31C is sized and/or configured to pass through aligned mounting socket 25-1 and arcuate slot 13C, and nut 32C is configured to engage with bolt 31C to secure lever 20 to adjustment plate 12C.

Example 5—Spring Adjustment Assembly with Pawl-and-Ratchet Fastener

Figure 5:
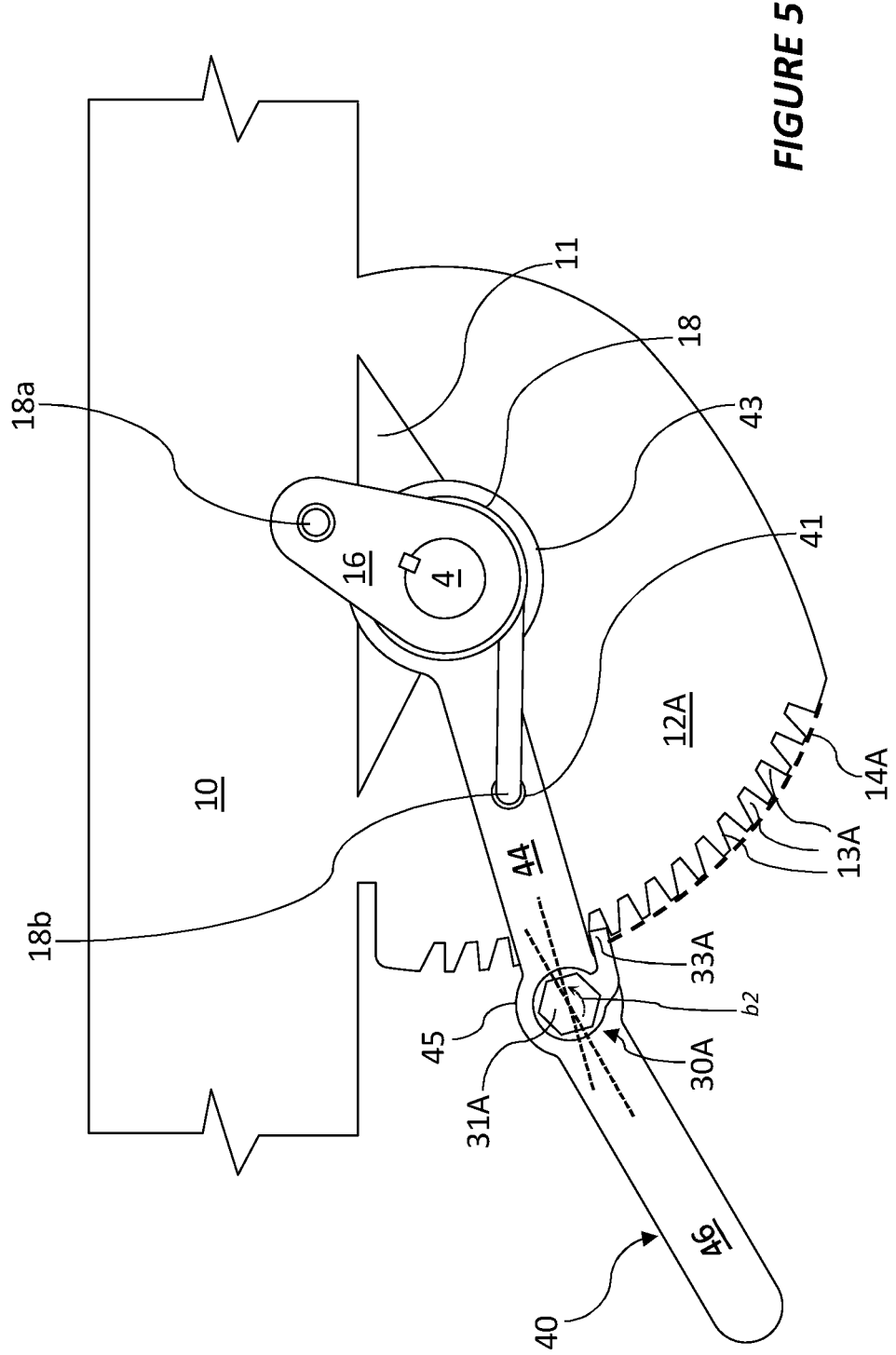
FIG. 5 is an elevational view of a ratchet-style spring adjustment assembly that includes tension-setting lever 40, which is secured to adjustment plate 12A at a select position by fastener 30A, which engages with notch 13A on the edge of adjustment plate 12A, adjustment plate 12A being configured with a plurality of uniformly spaced notch 13A for engaging with clip 33A to hold lever 40 in a select position against adjustment plate 12A.

FIG. 5 illustrates a spring adjustment assembly that utilizes a two-section, tension-setting lever, lever 40, operating with a pawl-and-ratchet system for adjusting the torque of a torsion spring supporting a finger wheel rake. The pawl-and-ratchet system is as discussed above in Example 2 (FIG. 2). Lever 40 differs from lever 20 in that the load-bearing arm and handle of the two-section lever are on the same side of the pivot portion of the lever and are connected through a mounting portion as illustrated in FIGS. 5-8.

Adjustment plate 12A is as discussed above in Example 2. Adjustment plate 12A operates with tension-setting lever 40 on the anterior side of adjustment plate 12A.

The lever 40 includes: (1) load-bearing arm 44; (2) handle 46 for adjusting the position lever 40; (3) pivot portion 43 about which lever 40 pivots; and (4) mounting portion 45 through which fastener 30A operates to anchor lever 40 to adjustment plate 12A.

Pivot portion 43 includes circular opening 43-1 (FIG. 8) through which cylindrical housing 6 supporting rotational shaft 4 of finger wheel rake extends from the posterior side of adjustment plate 12A to its anterior side to allow lever 40 to pivot about cylindrical housing 6/rotational shaft 4 (the pivot point of lever 40 aligning on the longitudinal axis of rotational shaft 4). Circular opening 43-1 also aligns with opening 11 on adjustment plate 12A, without necessarily being co-extensive.

Load-bearing arm 44 extends from pivot portion 43 towards mounting portion 45. Toque-adjustment leg 18b of spring 18 is secured to load-bearing arm 44 at joint 41.

Mounting portion 45 is situated at an internal position of the lever and connects load-bearing portion 44 with handle portion 46. Load-bearing arm 44 and handle portion 46 each adjoins mounting portion 45 and extends outwardly from mounting portion 45 to form a bend with angle b of about 170 degrees. Mounting portion 45 includes mounting socket 45-1 (FIG. 8) through which pawl fastener 30A operates to anchor lever 40 to adjustment plate 12A at a select position. The distance from center of mounting socket 45-1 to center of circular opening 43-1 is configured to account for the arc radius of adjustment plate 12A, i.e., the distance from rim portion 14A or notches 13A to nearest point on longitudinal axis of rotational shaft 4, in order to allow pawl fastener 30A to securely occupy any select notch of the plurality of notches 14A.

Pawl fastener 30A is secured to lever 40 at mounting portion 45 by bolt or pin 31A. The pawl free end 33A engages with a select notch of the plurality of notches 13A to anchor lever 40 to adjustment plate 12A at a select position as discussed above in Example 2.

Example 6—Spring Adjustment Assembly Utilizing Simple Pin

Figure 6:
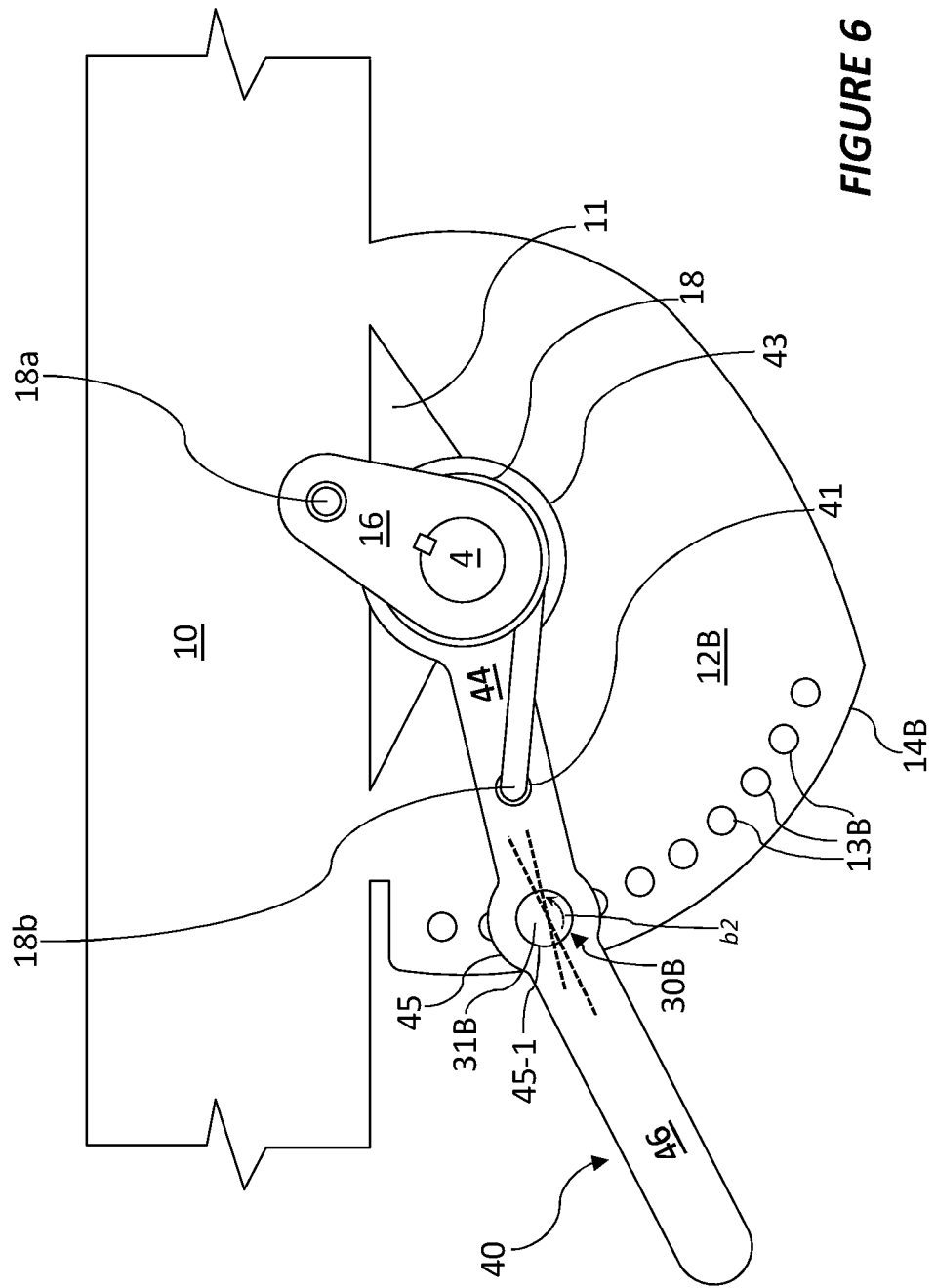
FIG. 6 is an elevational view of a spring adjustment assembly utilizing a simple pin lock mechanism that includes lever 40, which is secured to adjustment plate 12B at a select position by pin fastener 30B, which passes through mounting socket 45-1 of lever 40 and opening 13B on adjustment plate 12B to secure lever 40 to adjustment plate 12B, adjustment plate 12B having a plurality of openings 13B uniformly spaced in an arcuate pattern for receiving pin fastener 30B.

FIG. 6 illustrates a spring adjustment assembly that includes lever 40 (Example 5, FIG. 5) operating with adjustment plate 12B and a simple pin fastener 30B (Example 3, FIG. 3) to maintain the torque of a torsion spring supporting a finger wheel rake.

Adjustment plate 12B is as discussed above for Example 3. Adjustment plate 12B operates with lever 40 on the anterior side of adjustment plate 12B.

Lever 40 is as discussed above in Example 5. Lever 40 is pivoted about pivot portion 43/cylindrical housing 6/rotational shaft 4 to select a position to align mounting socket 45-1 with a select opening of the plurality of openings 13B. Lever 40 is then secured to adjustment plate 12B at the select position using pin fastener 30B thereby determining tension setting.

Example 7—Spring Adjustment Assembly Utilizing Arcuate Slot

Figure 7:
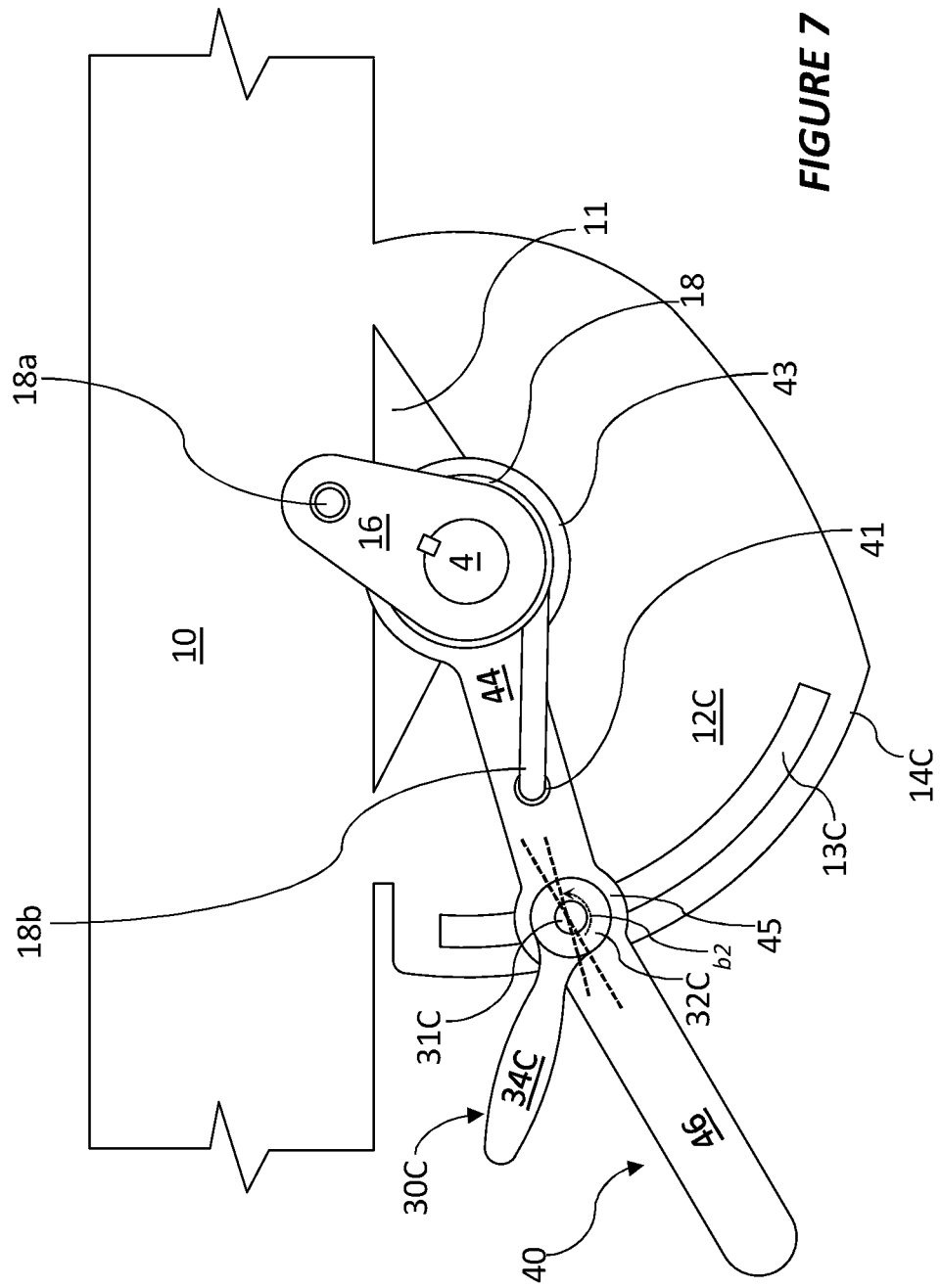
FIG. 7 is an elevational view of a bolt-and-slot spring adjustment assembly that includes lever 40, which is secured to adjustment plate 12C at a select position through operation of rotary fastener pair 30C, which includes anchor bolt 31C and nut 32C (with handle 34C), anchor bolt 31C passing through mounting socket 45-1 (FIG. 8) of lever 40 and arcuate slot 13C on adjustment plate 12C and held in place by nut 32C, thereby securing lever 40 against adjustment plate 12C at the select position.
Figure 8:
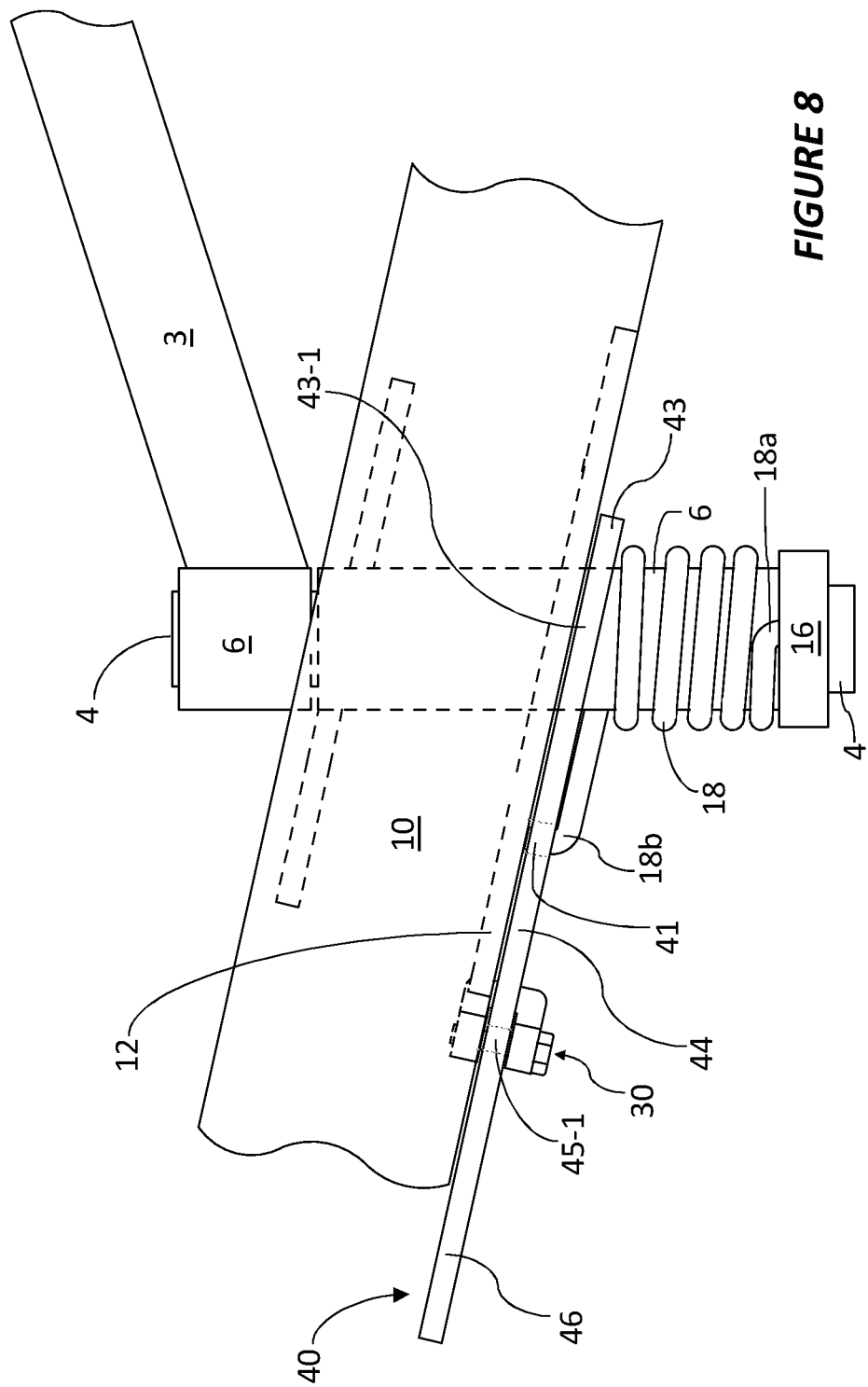
FIG. 8 is a top plan view of the components in another embodiment of a spring adjustment assembly of a finger wheel rake illustrating the relative positions of square main frame 10, tension-setting lever 40, which is anterior to adjustment plate 12 (beneath main frame 10), and rotational shaft 4 (of finger wheel rake represented by rake arm 3) within cylindrical housing 6 (beneath main frame 10) extending from the posterior to the anterior space defined by adjustment plate 12 (representing adjustment plate 12A, 12B and 12C illustrated in FIGS. 5, 6 and 7, respectively).

FIG. 7 illustrates a spring adjustment assembly that utilizes lever 40 (Example 5, FIG. 5) operating with adjustment plate 12C and rotary fastener 30C (Example 4, FIG. 4) to maintain the torque of a torsion spring supporting a finger wheel rake.

Adjustment plate 12C is as discussed above for Example 4. Adjustment plate 12C operates with lever 40 on the anterior side of adjustment plate 12C. Lever 40 is as discussed above in Example 5. Lever 40 is pivoted about pivot portion 43/cylindrical housing 6/rotational shaft 4 to select a position along the arcuate slot 13C (thereby selecting a tension setting). It is then secured to adjustment plate 12C at the select position/tension setting using rotary fastener 30C.

What is claimed is:

1. A torsion spring adjustment assembly for supporting a rake arm and finger wheel on a main frame of a finger wheel rake, the torsion spring assembly comprising:
   a lever operably connected to a torsion spring configured to support the rake arm for setting a tension of the torsion spring, the lever being pivotable about an axis of rotation of a rotational shaft of the finger wheel to a plurality of tension-setting positions and configured to be secured to the main frame of the finger wheel rake at a position selected from the plurality of tension-setting positions, the lever configured to be secured to the main frame using a mechanical fastener, and the lever comprising a mounting socket through which the lever is configured to be secured to the main frame; and
   an adjustment plate configured to be attached to the main frame, the adjustment plate determining the plurality of tension-setting positions, wherein the adjustment plate extends downwardly from the main frame in use, the adjustment plate comprising a female connector through which the lever is configured to be secured to the main frame, the adjustment plate defining a posterior space occupied by the finger wheel and an anterior space occupied by the lever and torsion spring in use, the female connector extending between the anterior space and posterior space.

2. The assembly of claim 1, wherein the lever is operably connected to the torsion spring through a load-bearing arm to which is secured a first leg of the torsion spring.

3. The assembly of claim 2, wherein the lever comprises a pivot portion adjoining the load-bearing arm, the pivot portion comprising an opening though which a cylindrical housing enclosing the rotational shaft of the finger wheel is configured to pass, thereby enabling the lever to be pivotable about the axis of rotation of the rotational shaft of the finger wheel.

4. The assembly of claim 1, wherein the mechanical fastener comprises a pin, a pawl, a bolt, a nut, another threaded rotary member, or any combination thereof.

5. The assembly of claim 1, wherein the mounting socket and the female connector are aligned thereby enabling the lever to be secured to the adjustment plate through a male fastener operating through the aligned mounting socket and female connector.

6. The assembly of claim 1, wherein:
   (a) the female connector comprises a plurality of indentations in a curved, rim portion of the adjustment plate that form an arcuate, toothed edge; and
   (b) the mechanical fastener comprises a pawl configured to engage with the toothed edge of the adjustment plate at a selected indentation of the plurality of indentations to secure the lever to the adjustment plate at a selected position.

7. The assembly of claim 1, wherein the female connector comprises a plurality of cylindrical openings uniformly spaced in an arcuate pattern such that each cylindrical opening aligns with the mounting socket when the lever is pivoted to a selected position.

8. The assembly of claim 7, wherein the mechanical fastener comprises a bolt or a pin that passes through the mounting socket and an aligned cylindrical opening of the plurality of cylindrical openings to secure the lever to the adjustment plate at the selected position.

9. The assembly of claim 7, wherein the mechanical fastener comprises a bolt and nut for securing the lever to the adjustment plate.

10. The assembly of claim 1, wherein the female connector comprises an arcuate opening configured to align with the mounting socket as the lever is pivoted.

11. The assembly of claim 10, wherein the mechanical fastener comprises a bolt or pin configured to pass through the mounting socket and the arcuate opening to secure the lever to the adjustment plate.

12. The adjustment assembly of claim 10, wherein the mechanical fastener comprises a bolt and a nut.

13. A torsion spring adjustment assembly for supporting a rake arm and finger wheel on a main frame of a finger wheel rake, the torsion spring assembly comprising:
- a lever operably connected to a torsion spring configured to support the rake arm for setting a tension of the torsion spring, the lever being pivotable about an axis of rotation of a rotational shaft of the finger wheel to a plurality of tension-setting positions and configured to be secured to the main frame of the finger wheel rake at a position selected from the plurality of tension-setting positions; and
- an adjustment plate configured to be attached to a portion of the main frame, the adjustment plate determining the plurality of tension-setting positions, the adjustment plate extending downwardly from the main frame in use, the adjustment plate comprising a female connector through which the lever is configured to be secured to the main frame, the adjustment plate defining a posterior space occupied by the finger wheel and an anterior space occupied by the lever and torsion spring in use, the female connector extending between the anterior space and posterior space.

14. The assembly of claim 13, wherein the lever is configured to be secured to the adjustment plate of the main frame using a mechanical fastener, wherein the lever comprises:
- (i) a load-bearing arm to which is secured a first leg of the torsion spring,
- (ii) a pivot portion adjoining the load-bearing arm, the pivot portion comprising an opening through which a cylindrical housing enclosing the rotational shaft of the finger wheel is configured to pass, thereby enabling the lever to be pivotable about the axis of rotation of the rotational shaft of the finger wheel, and
- (iii) a mounting socket through which the lever is configured to be secured to the main frame; and
- wherein the mechanical fastener comprises a male connector configured to engage with the female connector, the mounting socket, or the female connector and the mounting socket to secure the lever to the adjustment plate.

15. The assembly of claim 13, wherein the female connector comprises:
- an arcuate opening;
- a plurality of openings uniformly spaced in an arcuate pattern; or
- a plurality of indentations in a curved, rim portion of the adjustment plate that form an arcuate, toothed edge.

16. A finger wheel rake comprising the torsion spring adjustment assembly of claim 1.

17. A main frame of a finger wheel rake and a torsion spring adjustment assembly for supporting a rake arm and finger wheel on the main frame of the finger wheel rake, the torsion spring assembly comprising:
- a lever operably connected to a torsion spring configured to support the rake arm for setting a tension of the torsion spring, the lever being pivotable about an axis of rotation of a rotational shaft of the finger wheel to a plurality of tension-setting positions and being secured to or configured to be secured to the main frame of the finger wheel rake at a position selected from the plurality of tension-setting positions, the lever configured to be secured to the main frame using a mechanical fastener or secured to the main frame using the mechanical fastener, and the lever comprising a mounting socket through which the lever is configured to be secured to the main frame or through which the lever is secured to the main frame; and
- an adjustment plate attached to the main frame or configured to be attached to the main frame or that is a portion of the main frame, the adjustment plate determining the plurality of tension-setting positions, the adjustment plate extending downwardly from the main frame in use, the adjustment plate comprising a female connector through which the lever is secured to the main frame or is configured to be secured to the main frame, the adjustment plate defining a posterior space occupied by the finger wheel and an anterior space occupied by the lever and torsion spring in use, the female connector extending between the anterior space and posterior space.

18. The main frame of the finger wheel rake and the torsion spring adjustment assembly of claim 17, wherein the lever is operably connected to the torsion spring through a load-bearing arm to which is secured a first leg of the torsion spring.

19. The main frame of the finger wheel rake and the torsion spring adjustment assembly of claim 18, wherein the lever comprises a pivot portion adjoining the load-bearing arm, the pivot portion comprising an opening though which a cylindrical housing enclosing the rotational shaft of the finger wheel is configured to pass, thereby enabling the lever to be pivotable about the axis of rotation of the rotational shaft of the finger wheel.

20. A finger wheel rake comprising the main frame and the torsion spring adjustment assembly of claim 17.

21. A main frame of a finger wheel rake and a torsion spring adjustment assembly for supporting a rake arm and finger wheel on the main frame of the finger wheel rake, the torsion spring assembly comprising:
- a lever operably connected to a torsion spring configured to support the rake arm for setting a tension of the torsion spring, the lever being pivotable about an axis of rotation of a rotational shaft of the finger wheel to a plurality of tension-setting positions and being secured to or configured to be secured to the main frame of the finger wheel rake at a position selected from the plurality of tension-setting positions; and
- an adjustment plate attached to the main frame or configured to be attached to the main frame or that is a portion of the main frame, the adjustment plate determining the plurality of tension-setting positions, the adjustment plate extending downwardly from the main frame in use, the adjustment plate comprising a female connector through which the lever is secured to the main frame or is configured to be secured to the main frame, the downwardly extending adjustment plate defining a posterior space occupied by the finger wheel and an anterior space occupied by the lever and torsion spring in use, and the female connector extending between the anterior space and posterior space.

* * * * *